March 14, 1961 H. A. KLASENS 2,975,415
CATHODE RAY TUBE DISPLAY SYSTEM
Filed Jan. 7, 1957 2 Sheets-Sheet 1

INVENTOR
HENDRIK ANNE KLASENS

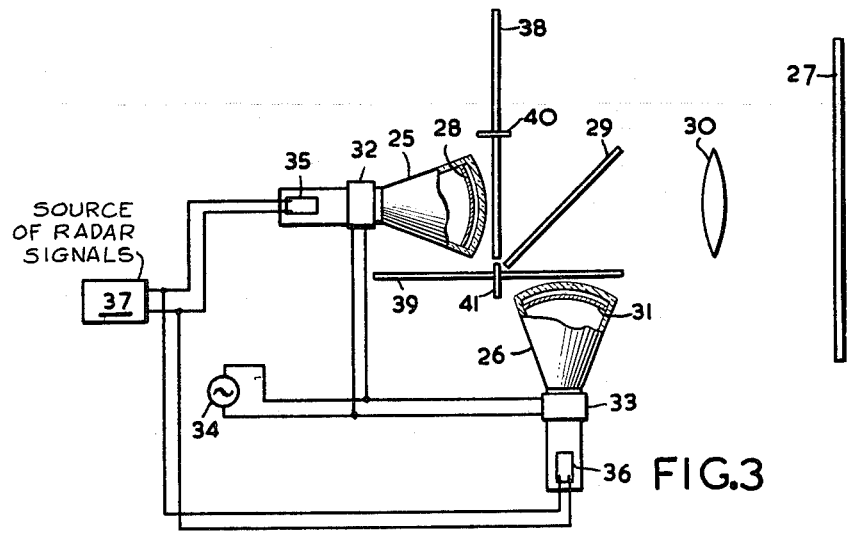
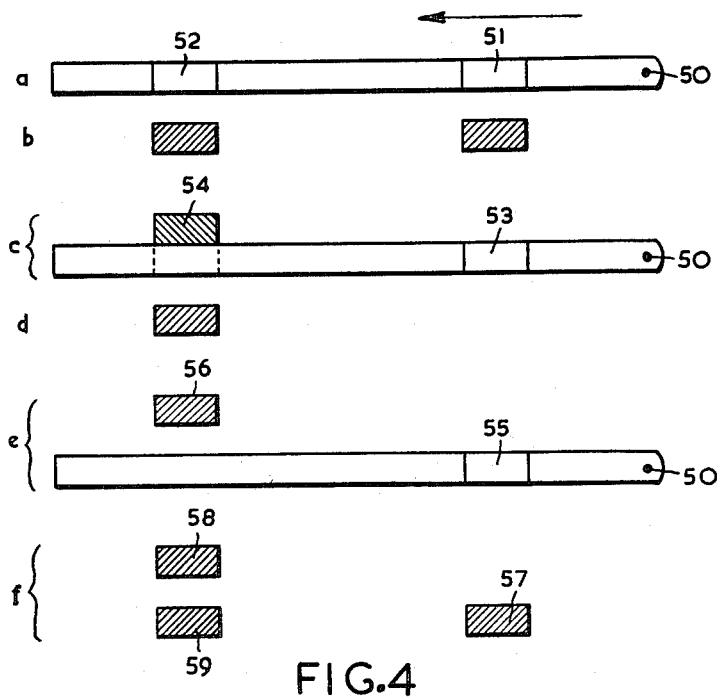
FIG.3
FIG.4

2,975,415
CATHODE RAY TUBE DISPLAY SYSTEM

Hendrik Anne Klasens, Eindhoven, Netherlands, assignor, by mesne assignments, to North American Philips Company, Inc., New York, N.Y., a corporation of Delaware Filed Jan. 7, 1957, Ser. No. 632,781

Claims priority, application Netherlands Feb. 7, 1956

10 Claims. (Cl. 343—17)

The invention relates to a radar display system in which a radar picture is projected onto a luminescent screen with the aid of a cathode-ray tube.

Radar display systems often comprise a cathode-ray tube, in which a radar picture is projected onto a luminescent screen. This is accomplished by means of an electron beam, which scans the screen in accordance with a given raster and the intensity of which is at the same time modulated. When this picture is viewed directly by the observer, we are concerned with a direct view radar system. In a variation of this system, which is usually termed a projection radar system, the picture projected by the electron beam onto the screen in the cathode-ray tube is projected optically onto a second luminescent screen arranged outside the tube. If desired, the optical system may then amplify the picture. With projection radar it is often desirable that the picture produced in the cathode-ray tube should irradiate a minimum quantity of visible light. This picture can be converted on the projection screen outside the tube into the luminous picture viewed by the observer. A known combination consists of a blue luminescent screen in the cathode-ray tube and a green-yellow luminescent screen outside the cathode ray tube.

It is known that it is desirable for the screen on which the visible radar picture is produced to have a comparatively long decay, for example of the order of 1 to 5 sec., since the time in which a complete raster is written is of this order of magnitude. It is for example common practice to scan a radar screen as follows: the point of impact of the electron beam on the screen follows, from a starting point, for example, the center of a circle, a radius at a rapid rate and returns to the starting point. Then the point of impact follows a radius which is at a small angle to the radius already scanned. Thus the screen is scanned so to say by a rotating radius. Such a system is usually termed plan-position-indicator, or briefly P.P.I. During the cycle, for example 1 to 5 sec., of the rotating radius the information present at a given part of the screen must remain visible. However, as soon as the beam strikes the same place, the former information should be faded to an extent such that the new information is not disturbed by the former.

It is known to extinguish out the prior information periodically by means of short impacts of red or infrared radiation projected onto the screen. In such a system the luminescent screen on which the picture is produced comprises luminescent substances, the luminescence of which can be extinguished within a very short time by a radiation having a wavelength of more than 6000 A. Suitable substances are, for example, copper-activated cadmium sulphide and bismuth-activated calcium pyrophosphate. With this system the procedure is such that, starting from a given position, the radius writes a complete picture and that, immediately before the radius starts writing a new picture, the whole picture is extinguished by the radiation of a wavelength of more than 6000 A.

This method may be used both with direct-view radar and with projection radar. It is evident that this method has the disadvantage that the time during which the information is visible on a given part of the screen varies with the position of this part relative to the place occupied by the electron beam at the instant when the extinguishing radiation is projected onto the screen. Parts, adjacent this place, and written by the radius immediately after the extinction of the extinguishing radiation remain visible for the complete time interval between the start and the termination of the extinguishing radiation. Parts excited immediately before the start of the extinguishing radiation are visible, however, only for a very short time.

With radar systems it is often required that in the radar image a distinction should be possible between moving and stationary objects. In principle, there is always a small difference between these two, which is due to the decay since a moving object never occupies the same place on the screen during successive scans, so that it is not exactly the same part of the screen which is re-excited by the electron beam. Since the image of the preceding scan is, usually, partly visible, a tail of decreasing light intensity is visible after the luminous spot corresponding to moving objects. The length of this tail is, of course, variable with the speed of the moving object relative to the scanning speed. Moreover the shape and the luminous intensity of the tail vary with the direction of movement relative to the direction of scanning. Experience has proved that it is very difficult to decide on the basis of this distinction whether an object is moving or stationary, since the differences are usually small. It has therefore been suggested to use double screens or mixtures of particular luminescent substances, so that a colour difference is obtained between the pictures of moving and of stationary objects. However, the results obtained by such systems are not always satisfying.

The invention has for its object to provide a universally employable radar system, which provides for distinguishing in a simple manner, at will, between moving objects and stationary objects and/or of avoiding the aforesaid disadvantages inherent in systems in which the radar pictures are extinguished intermittently.

With a radar system, more particularly a P.P.I., according to the invention a radar picture is produced on a luminescent screen arranged inside or outside a first cathode-ray tube, the luminescence of which screen can be extinguished by radiation having a wavelength of more than 6000 A. This system is characterized by the fact that provision is made of a second, similar cathode-ray tube having a luminescent screen which emits, upon being exited by electrons, a radiation of a wavelength of more than 6000 A. and by the fact that the luminescent screens of the two cathode-ray tubes are scanned in a similar manner and the picture of the screen of the second cathode-ray tube is projected optically onto the screen on which the radar picture is produced.

The invention may be used both with direct-view radar and with projection radar. With direct-view radar the picture written on the luminescent screen emitting by electron impact a radiation of a wavelength exceeding 6000 A., this tube being termed hereinafter the extinction tube, must, of course, be projected onto the screen of the first cathode-ray tube. With projection radar the picture of the extinction tube may be projected onto the screen of the first cathode-ray tube or onto the projection screen arranged outside this tube. With the latter method use will generally be made of an optical system both for amplified projection of the picture of the first cathode-ray tube and for amplified projection of the picture of the extinction tube. For the two projections use may be made of the same magnifying optical system, for example if a mirror is employed. It is not strictly necessary that the deflection voltages supplied to the two tubes should be exactly of the same value at any instant. Use may, if necessary, be made of simple attenuators or amplifiers in the supply leads to the deflection elements of one or of the two tubes.

If a system according to the invention should provide only an extinction, it is not necessary to supply to the extinction tube signals to control the intensity of the electron beam. Then the tubes are arranged so that the points produced by the first cathode-ray tube, the intensity of this point varying with the reflected radar pulse supplied to this tube, lags slightly relatively to the point produced by the extinction tube, the intensity of which point is not modulated. Since the latter spot slightly leads in the scan direction, all residual information of a preceding scan is extinguished immediately before a new information is written. The time of leading may be very short, so that the two spots on the radar screen follow, for a large part, the same line, for example with a P.P.I. the same radius. However, this will usually not be necessary and the system may be such that the two spots are spaced apart from the starting point of rotation of the radii by the same distance, the radius of the extinction tube, however, leading slightly relatively to the radius of the first cathode-ray tube. Particularly with the latter system it is very advantageous that the two cathode-ray tubes are exacly identical both geometrical and electrical and have, in particular, the same deflection sensitivity, since in this case the complete device is very simple, it being possible to supply the deflection signal in parallel to the two deflectors. The leading in time can then be obtained simply by turning slightly one tube relatively to the other, if electrostatic deflectors are used, or by turning the deflection coil system, if electromagnetic deflectors are used. If desired, the leading time may be varied in a very simple manner.

An important advantage obtained by the aforesaid extinction method of the radar picture in accordance with the invention is that each information remains visible for the same period.

If desired, a system according to the invention can be used for distinguishing between moving and stationary objects, in which case the signals derived from the reflected radar pulses are supplied to the two cathode-ray tubes to control the current intensity of the electron beams. Consequently, the radar picture is written on the luminescent screens of the two cathode-ray tubes.

If these two pictures were projected simultaneously one on the other, there would be produced substantially no picture on the radar screen. Even if the picture of the extinction tube is caused to lead in time no solution is obtained since owing to the intensity modulation of the electron beam of this tube not all spots of the radar screen could be extinguished. However, if a picture of each of the two tubes is written intermittently on the radar screen, a distinct radar picture is obtained, since first a complete picture is produced, after which this is partly extinguished. It is then not necessary that a single writing cycle should be followed immediately by an extinguishing cycle. The radar picture may, for example, be produced several times by the first cathode-ray tube, after which the picture is extinguished by the projection of the picture of the extinction tube.

Since the electron beam of the extinction tube is also modulated in accordance with the incoming radar pulses, a distinction is produced on the radar screen between the pictures of moving and those of stationary objects, since stationary objects produce invariably at the same place a luminous spot. This luminous spot is just extinguished by the picture of the extinction tube. However, the moving object has shifted its place during the time between the instant when the picture thereof is written and the instant when the picture of the extinction tube is projected. Consequently, the picture produced does not completely coincide with the picture of the extinction tube at the instant when the picture of the latter is projected onto the picture already written. Thus the picture of the moving object is not completely extinguished. After an extinction cycle a picture is left on the radar screen, in which picture nothing is left on the luminous spots corresponding to the stationary object, but in which at least part of those of the moving objects is visible. Consequently, after an extinction cycle or even during the extinction cycle, it is directly evident which luminous spots correspond to moving objects. If, after the extinction cycle, the first cathode-ray tube again produces a picture, this new picture lies of course again at the same place of the radar screen for the stationary objects, but is shifted in place for the moving objects, not only relative to the former picture but also relative to the picture projected during the preceding extinction cycle. Then the picture of the moving objects on the radar screen consists of luminous spots of the aforesaid picture separated by a dark portion from the luminous spots left of the preceding picture. The intensity of the latter luminous spots has decreased in the meantime, but with a suitably chosen decay these spots will nevertheless be distinctly visible. Consequently with successive writing cycles and extinction cycles a kind of dotted line is produced for moving objects.

The intermittent operation may be carried out by mechanical or by electrical means. Mechanically this may be obtained for example by using one or more shutters as those used with film projectors, electrically by suppressing the electron beam for the time required for writing a complete raster or a multiple thereof, for example by means of high negative grid voltage.

By simple commutation the system according to the invention may be used, of course, for the simple extinction described above and for making a distinction between moving and stationary objects. If desired, the two methods of operation may be alternated.

The invention will be described more fully with reference to the drawing, in which:

Fig. 3 shows a projection radar system, in which the rasters are intermittently projected, and Fig. 4 shows diagrammatically how a distinction can be made by the system according to the invention between moving and stationary objects.

Figure 1:
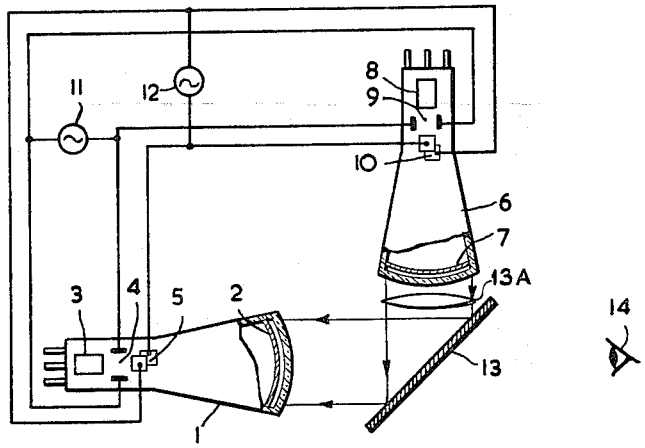
Fig. 1 shows a direct-view radar system according to the invention.

Referring to Fig. 1, reference numeral 1 designates the radar display tube, in which the radar picture is produced on the luminescent screen. The electrode system is shown diagrammatically and consists of a set of electrodes 3 to produce a concentrated electron beam and two sets of deflectors 4 and 5, arranged at an angle of 90° to one another. The system comprises, furthermore an extinction tube 6, having a luminescent screen 7 and an electrode system which is shown diagrammatically and which consists of a set of electrodes 8 to produce a concentrated electron beam and two sets of deflectors 9 and 10. The geometrical construction of the two tubes is identical. The screen 2 contains luminescent substances, the radiation of which can be extinguished by a radiation of a wavelength exceeding 6000 A., which is emitted by the screen 7 of the tube 6. It is evident from the figure that the sets of deflectors 4 and 9 and the sets 5 and 10 respectively are connected directly to one another. To these deflectors are supplied at 11 and 12 deflection voltages. Thus the same rasters are written in the two tubes. With the aid of a semi-transparent or dichroic mirror 13 and a lens 13ª the picture of the tube 7 is projected onto the picture of the luminescent screen 2 of the tube 1. For image extinction, the tube 6 is adjusted relatively to the mirror 13 and the tube 1 in a manner such that the picture of the screen 7, after the projection onto the screen 2, slightly leads in time. The observer 14 views the radar picture throuugh the mirror 13 on the tube 1.

Figure 2:
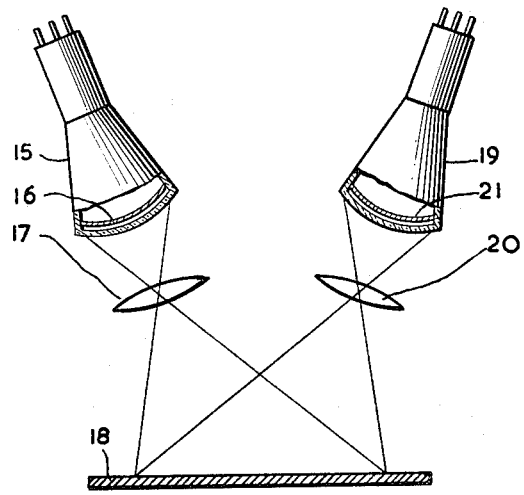
Fig. 2 shows a projection radar system.

Figure 2 shows a projection radar system, in which a radar picture is produced on the screen 16 in the tube 15. By means of the optical system 17 this picture is reproduced and magnified on the radar projection screen 18. Onto this screen 18 is also projected the picture of the screen 21 of the extinction tube 19. The optical system 20 provides the same size, for the two pictures. As in the embodiment shown in Fig. 1, the deflection signals are fed simultaneously to the two tubes 15 and 19. Also with this projection radar system the picture of tube 19 leads slightly in time relatively to the picture of tube 15 in order to obtain the extinction.

The screen 18 may be provided with, for example, copper activated zinc cadmium sulphide as a luminescent substance. The screen 16 may have, for example, silver-activated zinc sulphide and the screen 21 may have the substances referred to above.

Fig. 3 shows a radar projection system having a writing tube 25, an extinction tube 26 and a projection screen 27. The radar picture written on the screen 28 of the tube 25 is projected through the semi-transparent mirror 29 onto the screen 27 by means of the optical system 30. The picture written on the screen 31 of the extinction tube 26 is also projected via the mirror 29 and the optical system 30 onto the screen 27. The screen 27 is coated with luminescent substances, which are adapted to be excited by the radiation from the screen 28 and which then emit visible radiation, which can be extinguished by the radiation from the screen 31. The two tubes 25 and 26 are provided with electromagnetical deflection systems 32 and 33 respectively, to which the deflection signals from the source 34 are fed in parallel. The intensity of the electron beams in the two tubes is modulated simultaneously and similarly by supplying the radar pulses from the device 37 in parallel to the intensity control-electrodes of the electrode systems designated by 35 and 36 respectively. The device 37 may be a radar receiver, such as disclosed in "Principles of Radar," by the M.I.T. Radar School Staff, McGraw-Hill Book Co., Inc., 1946, pages 4–1 through 4–4. Thus in the two tubes exactly the same pictures are produced at the same instant. These two pictures would be projected onto the screen 27 at the same instant, if the shutters 38 and 39 were not provided. The shutters 38 and 39 are constituted, as usual, by a disc having a pass aperture; they rotate about shafts designated by 40 and 41. The adjustment and the speed of rotation of the shutters 38 and 39 are chosen to be such that the pictures from the screens 38 and 31 are projected intermittently onto the screen 27. If the two pictures are reproduced on the screen 27 exactly at the same place, the information from the source 37 is alternately written and extinguished on this screen. It is thus possible to distinguish between moving and stationary objects, which will be explained hereinafter with reference to Fig. 4.

As an alternative, the electron beams in the tubes 25 and 26 may be suppressed by electrical means. Then the shutters 38 and 39 may be omitted. Even a combination of the two systems may be realized.

Fig. 4 shows parts of a picture obtainable by means of a system as shown in Fig. 3. It is assumed that the picture in the two cathode-ray tubes is recorded by a rotating radius, along which moves the scanning electron spot. In Fig. 4 the point of rotation of the radii is designated by 50 and the spots move in the direction of the arrow; during this movement are supplied the signals from the reflected radar pulses. It is assumed that at the area 51 a luminous spot is produced by the pulses reflected from a stationary object and at the area 52 a luminous spot produced by the pulses reflected from a moving object. It is furthermore assumed that this object moves in a direction at right angles to the radii in the positions shown. The areas 51 and 52 of the tube 25 are projected onto the screen 27, on which is thus visible the picture shown in Fig. 4b. The radii rotate further, after the recording of the spots 51 and 52 and exactly before they are going to occupy the same positions, the shutter 38 prevents the picture of tube 25 from being projected onto the screen 27.

The radius in the tube 26 rotates simultaneously with the radius in the tube 25. Since the same signals are supplied to the tube 26 the same picture is produced on the screen 31. However, this picture is not projected onto the screen 27, since the shutter 39 prevents it. After the radii have performed one rotation, the shutter 38 prevents the picture of tube 25 from being projected and the shutter 39 passes the light for the projection of the picture of tube 26 onto the screen 27. Fig. 4c shows a radius which is covered at this instant by the electron spot. At the area 51 a luminous spot is produced owing to the radar pulses reflected by the stationary object. The spot of the screen 31 is projected by the optical system on exactly the same area of the screen 27, where the spot 51 of the screen 28 has been projected. This spot is thus extinguished, since the radiation from the screen 31 is adapted to extinguish the radiation from the screen 27. At the instant when the electron spot is at the area corresponding with the area 52 of Fig. 4a (indicated by broken lines in Fig. 4c), the tube 26 does not receive signals from the reflected radar pulses from the moving object, since during the time when the radii performed one rotation this object has moved and occupies, for example, such a position (in the two tubes) that a luminous spot 54 is produced after the radii have performed slightly more than one rotation. Consequently, at the area 52 of the screen 27 no light from the screen 31 is produced. The luminous spot 52 on the screen 27 produced by the first scanning cycle is, consequently, not extinguished and remains visible. The luminous spot 54 on the screen 28 cannot be projected onto the screen 27, since the shutter 38 prevents it. The luminous spot 54 of the screen 31 is, however, projected, but does not produce a luminous spot on the screen 27, since the radiation has too long a wavelength, i.e. more than 6000 A. After two complete scanning cycles of the radii all luminous spots from stationary objects on the screen 27 have vanished; the luminous spot 52, however, from the moving object is still visible. The picture on the screen 27 is shown in Fig. 4b. Fig. 4e shows the radius followed by the electrons in the two tubes after the extinction cycle. At the area 55 a luminous spot corresponding to the stationary object is produced. The moving object has moved in the meantime, so that it produces a luminous spot at 56, when the radius is at this area. After slightly more than two rotations the screen 27 shows the luminous spot 56, the luminous spot 58 and also the luminous spot 59, which has not been extinguished (Fig. 4f). The path of the moving object is thus recorded in the form of a dotted line. Since the intensity of the luminous spot 59 has, in the meantime, decreased, it can be stated in a simple manner that after the second scanning cycle no other object has produced a luminous spot at the area 52, since otherwise the luminous spots 58 and 59 would have the same intensity.

There will generally be also a difference in intensity between the luminous spots from stationary and moving objects respectively, which may be accounted for as follows:

A spot of a luminescent screen emitting a radiation which can be extinguished by a radiation of a wavelength exceeding 6000 A., requires more excitation energy, when it was extinguished a short time before, than a spot which has not been extinguished or which was extinguished a longer time before, if the same brightness is to be obtained. If these two spots are irradiated by a radiation of the same energy, the spot which has been extinguished requires more time before it has obtained the same, for example the maximum brightness. If the same brightness is to be attained at the same instant after the irradiation of the radiation, the quantity of energy supplied per unit time to irradiate the extinguished spot must be higher than that required for the unextinguished spot. This phenomenon is usually worded in English literature as follows: the build-up time is longer for a spot which has been extinguished than for a spot which has not been extinguished. This build-up time may often be increased by introducing suitable co-activators into the luminescent substance. The co-activators may be, for example, scandium or gallium for copper-activated zinc- or cadmium sulphide.

With a system according to the invention, in which a distinction is to be made between moving and stationary objects in the manner described with reference to Figs. 3 and 4, the difference in build-up time yields the aforesaid difference in intensity of the luminous spots corresponding to the stationary and the moving objects respectively, since the luminous spots corresponding to stationary objects are alternately written and extinguished. At these areas the build-up time will consequently be longer than that at the areas, where luminous spots from moving objects are produced, since the latter are written at least partly at areas which have not been extinguished or which were extinguished a long time before. The system according to the invention could even be constructed and operated in a manner such that only luminous spots corresponding to moving objects are produced on the radar screen, since the build-up time of the luminescent material may be chosen to be such that the time between the excitation and the extinction is too short to produce any luminescence. This finally results in that the paths of the moving objects are reproduced on the screen only as dotted lines.

The effect of the difference in build-up time may, of course, be acted upon by choosing the intensity of the excitation radiation or the extinction radiation. As an alternative, by varying the ratio between the number of writing cycles and of extinction cycles the differences between the intensities of the luminous spots corresponding to stationary objects and those corresponding to moving objects may be acted upon.

As stated above, it is not necessary to alternate one writing cycle and one extinction cycle. For example, a plurality of writing cycles may be combined with a single extinction cycle. To this end, it is sufficient to vary the speeds of revolution of the shutters 38 and 39. Such a variations can, of course, be realized by electrical means in a simpler manner. Thus, sometimes a more sharply defined dotted line may be obtained with different relative speeds of the rotating radius and the moving object.

What is claimed is:
1. A cathode ray tube display system comprising a first luminescent screen, means for scanning said screen in a given pattern to produce a raster, means for modulating said raster to produce an image, said screen having the characteristic that its luminescence is extinguishable by radiation of a given wavelength, a second luminescent screen, means for scanning said second screen in accordance with said given pattern to produce a raster, said second screen having the characteristic of emitting radiation of said given wavelength, and means for optically projecting the raster of said second screen onto the raster of said first screen.

2. A system as claimed in claim 1, in which said first screen has the characteristic that its luminescence is extinguishable by radiation of a wavelength exceeding 6000 A., and in which said second screen has the characteristic of emitting radiation of a wavelength exceeding 6000 A.

3. A cathode ray tube display system comprising a first cathode-ray system having a luminescent screen, a source of an electron beam, means to excite a movable spot on said screen in accordance with the position of said electron beam, and means for scanning said electron beam to cause said spot to move in a given pattern to produce a raster on said screen, means for modulating said electron beam in accordance with input signals to produce an image on said screen, said screen having the characteristic that its luminescence is extinguishable by radiation of a given wavelength, a second cathode-ray system having a luminescent screen, a source of an electron beam, and means to scan said beam over said screen in accordance with said given pattern to produce a raster, said last-named screen having the characteristic of emitting radiation of said given wavelength, and means for optically superimposing the raster of said second system upon the raster of the first system.

4. A system as claimed in claim 3, in which the electron beam of said first cathode-ray system impinges upon the luminescent screen of said first cathode-ray system.

5. A system as claimed in claim 3, in which said first cathode-ray system includes an intermediate screen upon which said electron beam impinges, said first system further including means for projecting an image of said intermediate screen onto the luminescent screen of said first system.

6. A system as claimed in claim 3, in which the intensity of the electron beam of said second cathode-ray system is maintained substantially constant, and including means for maintaining the moving spot of said second cathode-ray system relatively ahead of the moving spot of said first cathode-ray system.

7. A system as claimed in claim 6, in which said given pattern consists of the scanning path of said spot along a radius on each of said screens, said radii rotating about a center point, and including means for maintaining the scanned radius of said second cathode-ray system relatively ahead of the scanned radius of said first cathode-ray system.

8. A system as claimed in claim 3, in which said second cathode-ray system includes means to modulate the electron beam thereof in accordance with said input signals to produce an image on the screen thereof, and including means to cause said first and second cathode-ray systems to produce their respective images alternately.

9. A system as claimed in claim 8, in which the last-named means comprises mechanical shutters respectively positioned in the optical paths of said first and second cathode-ray systems.

10. A system as claimed in claim 8, in which the last-named means comprises electrical means for intermittently suppressing the electron beam of at least one of said cathode-ray systems.

References Cited in the file of this patent
UNITED STATES PATENTS

| | | |
|---|---|---|
| 2,276,359 | Von Andenne | Mar. 17, 1942 |
| 2,668,286 | White | Feb. 2, 1954 |
| 2,798,901 | Harter | July 9, 1957 |